(12) United States Patent
Parry et al.

(10) Patent No.: US 11,775,422 B2
(45) Date of Patent: Oct. 3, 2023

(54) LOGIC REMAPPING TECHNIQUES FOR MEMORY DEVICES

(71) Applicant: Micron Technology, Inc., Boise, ID (US)

(72) Inventors: Jonathan S. Parry, Boise, ID (US); David Aaron Palmer, Boise, ID (US); Giuseppe Cariello, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 40 days.

(21) Appl. No.: 17/399,406

(22) Filed: Aug. 11, 2021

(65) Prior Publication Data

US 2023/0051212 A1  Feb. 16, 2023

(51) Int. Cl.
*G06F 12/00* (2006.01)
*G06F 12/02* (2006.01)
*G06F 3/06* (2006.01)

(52) U.S. Cl.
CPC .......... *G06F 12/0246* (2013.01); *G06F 3/0619* (2013.01); *G06F 3/064* (2013.01); *G06F 3/0659* (2013.01); *G06F 3/0679* (2013.01); *G06F 12/0253* (2013.01); *G06F 2212/466* (2013.01); *G06F 2212/7201* (2013.01)

(58) Field of Classification Search
CPC ..... G06F 12/0246; G06F 3/0619; G06F 3/064; G06F 3/0659; G06F 3/0679; G06F 12/0253; G06F 2212/466; G06F 2212/7201

USPC .......................................................... 711/154
See application file for complete search history.

(56) References Cited

U.S. PATENT DOCUMENTS

| | | | | |
|---|---|---|---|---|
| 2015/0046670 A1* | 2/2015 | Kim et al. | .......... | G06F 12/0246 711/207 |
| 2020/0409870 A1* | 12/2020 | Yeap et al. | ......... | G06F 16/9017 |

FOREIGN PATENT DOCUMENTS

WO      2016112957 A1 *    7/2016    ................G06F 12/10

* cited by examiner

*Primary Examiner* — Mardochee Chery
(74) *Attorney, Agent, or Firm* — Holland & Hart LLP

(57) ABSTRACT

Methods, systems, and devices for logic remapping techniques are described. A memory system may receive a write command to store information at a first logical address of the memory system. The memory system may generate a first entry of a logical-to-physical mapping that maps the first logical address with a first physical address that stores the information. The memory system may perform a defragmentation operation or other remapping operation. In such a defragmentation operation, the memory system may remap the first logical address to a second logical address, such that the second logical address is mapped to the first physical address. The memory system may generate a second entry of a logical-to-logical mapping that maps the first logical address with the second logical address.

25 Claims, 7 Drawing Sheets

US 11,775,422 B2

LOGIC REMAPPING TECHNIQUES FOR MEMORY DEVICES

FIELD OF TECHNOLOGY

The following relates generally to one or more systems for memory and more specifically to logic remapping techniques.

BACKGROUND

Memory devices are widely used to store information in various electronic devices such as computers, user devices, cameras, digital displays, or others. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
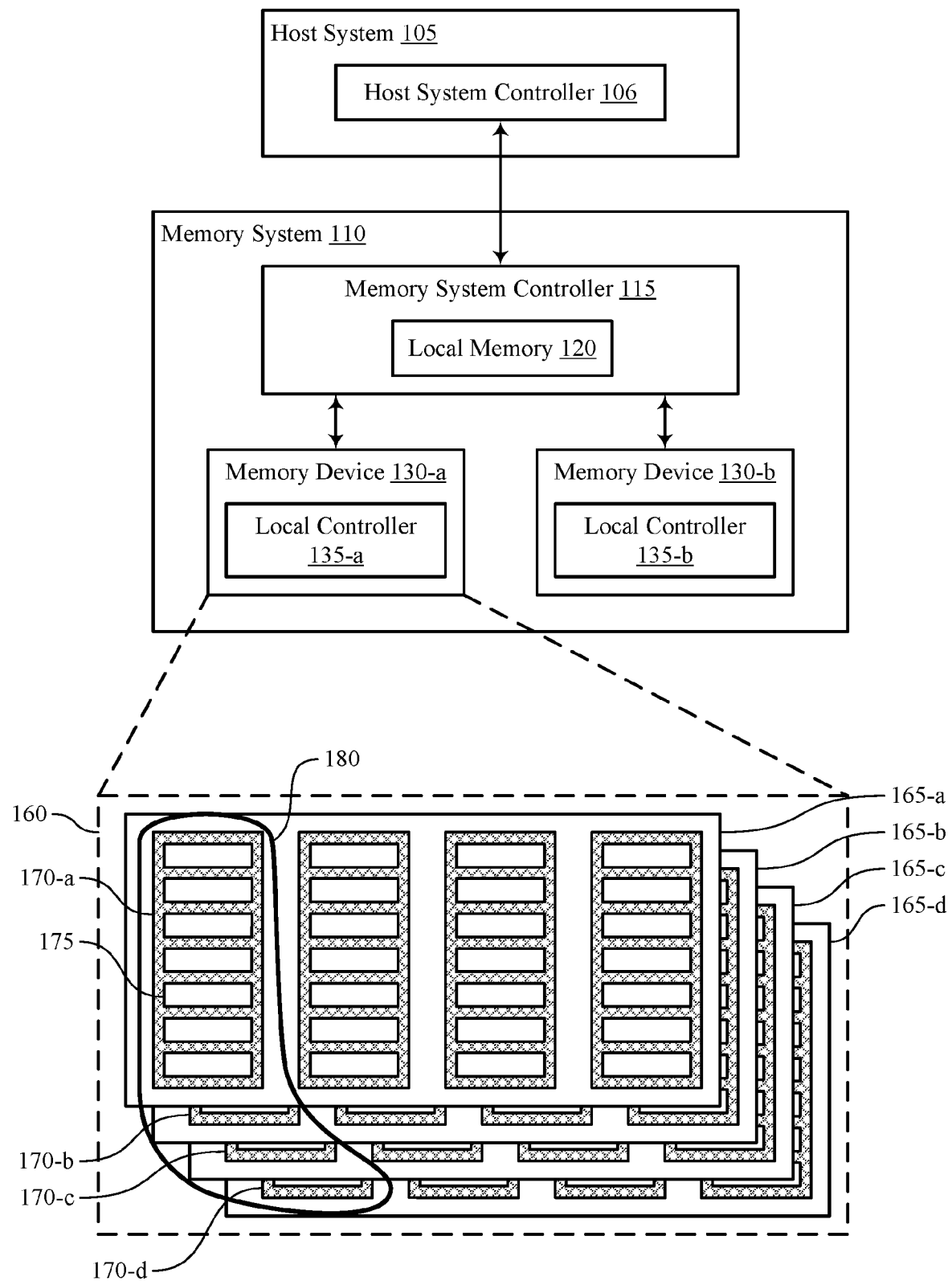
FIG. 1 illustrates an example of a system that supports logic remapping techniques in accordance with examples as disclosed herein.

Memory devices of a memory system may store data at a physical address. For example, the memory system may receive a write command indicating data for the memory system to write in one or more memory devices. The write command may include a logical address for storing the data, which may be different than the physical address for storing the data. The memory system may store the data at a physical location of a memory device that corresponds to the physical address. In some cases, the physical or logical location of data within a memory device may change over time due to the memory device accommodating the writing of additional data, maintenance operations performed by the memory device (e.g., garbage collection operations), or for other reasons. In some examples, a host system or a memory system may perform defragmentation operations to improve system performance. For example, a defragmentation process may include reorganizing the logical address one or more files in a contiguous logical address space (rather than these logical addresses being scattered throughout a logical address space), which may improve performance and storage density in the system.

In some cases, a host system coupled with the memory system may reference data (e.g., if issuing read, write, or other commands associated with the data) using logical addresses (e.g., logical block addresses (LBAs), virtual addresses, system addresses, or other logical addresses), and the memory system may generate and maintain a mapping between the logical addresses associated with the data and the physical addresses of the memory cells at which the data is stored. The memory system may store the mapping between logical addresses and physical addresses in a mapping or a table (e.g., a logical-to-physical (L2P) mapping or L2P table) which may be updated if changes are made to the logical or physical addresses. As an example, the host system or the memory system may assign a new logical address to the data (e.g., the memory system may relocate a logical address to the new logical address as part of a defragmentation operation). In some such examples, the host system or the memory system may also rewrite the data to a new physical address, for example, to maintain the accuracy of the L2P table and avoid internal incongruities with metadata stored with the data at the physical address. However, relatively frequent rewriting of data between physical address may increase latency, increase power consumption, and may reduce the lifetime of the memory system.

Accordingly, the techniques described in the present disclosure provide a memory system with a logical-to-logical (L2L) mapping or L2L table. The memory system may use the L2L table (e.g., L2L mapping) in addition or alternative to an L2P table to support the remapping of logical addresses using a defragmentation operation. In some examples, the L2L table may be used to remap logical addresses without writing the data to a new physical address of the memory system. For example, a memory system having an L2P table may undergo a defragmentation operation to alter one or more L2P entries (e.g., L2P pointers) of the L2P table that map logical addresses (used by the host system) with physical addresses (used by the memory system). In such examples, the memory system may change a logical address of data to a new logical address in the L2P table, for example, in response to a host command (e.g., MOVE command) as part of the defragmentation operation performed on the file system. The memory system may generate an entry of an L2L table that maps the first logical address to the second logical address, the first logical address being associated with information stored at the physical address before the defragmentation operation, and the second logical address being associated with information stored at the physical address after the defragmentation operation. Thus, the memory system may use the L2L table to maintain an up-to-date mapping of logical and physical addresses without rewriting the data to a new physical address. For example, some memory systems may perform a defragmentation operation by issuing a plurality of read and write commands to not only move the data to a new logical address but that also results in the data moving to a new physical address as well. Recording the changed logical address in the L2L table may enable the memory system to successfully validate metadata (e.g., using the first logical address with which the metadata was generated upon storage of the data) without having to rewrite the data to a new physical address of the data.

In some examples, the memory system may receive a command to read an L2P entry that may point directly to a physical address, or may point to an entry of the L2L table. In examples where the L2P entry points to a physical address, the memory system may, in some examples, use the L2L table to verify that the metadata stored at the physical address matches the logical address. For example, an indication of the logical address associated with the physical address may be included in the metadata. If the logical address in the L2P mapping is changed, the metadata may remain unchanged, which may result in a mismatch between the logical address indicated in the L2P table and the logical address indicated in the metadata. In examples where the L2P entry points to an entry of the L2L table (e.g., an L2L table described with reference to FIG. 4), the memory system may use the L2L table to identify the physical address for retrieving the data and also to validate the metadata (e.g., the metadata that matches a previous logical address rather than the current logical address). In some cases, the memory system may use the first logical address (e.g., associated with information stored at the physical address before defragmentation) to verify the metadata. These techniques may enable the memory system to maintain up-to-date mapping between logical and physical address and prolong the lifetime of the memory device, among other benefits.

In some examples, the memory system may utilize or update the L2L table during garbage collection operations. For example, the memory system may search the L2L table during garbage collection or in response to other criteria (e.g., if a mismatch in metadata is detected or during error handling). Additionally or alternatively, the memory system may maintain a bitmap of physical addresses that have been remapped from a first logical address to a second logical address (e.g., physical addresses that include an entry in the L2L table). In some examples, the memory system may include a counter indicating the quantity of remapped locations in a memory block (e.g., a virtual block). In such examples, the memory system may prioritize garbage collection in blocks associated with a relatively high quantities indicated by a respective counter (e.g., the memory system may perform garbage collection in response to a counter satisfying a threshold or indicating a highest quantity of remapped addresses).

Figure 2:
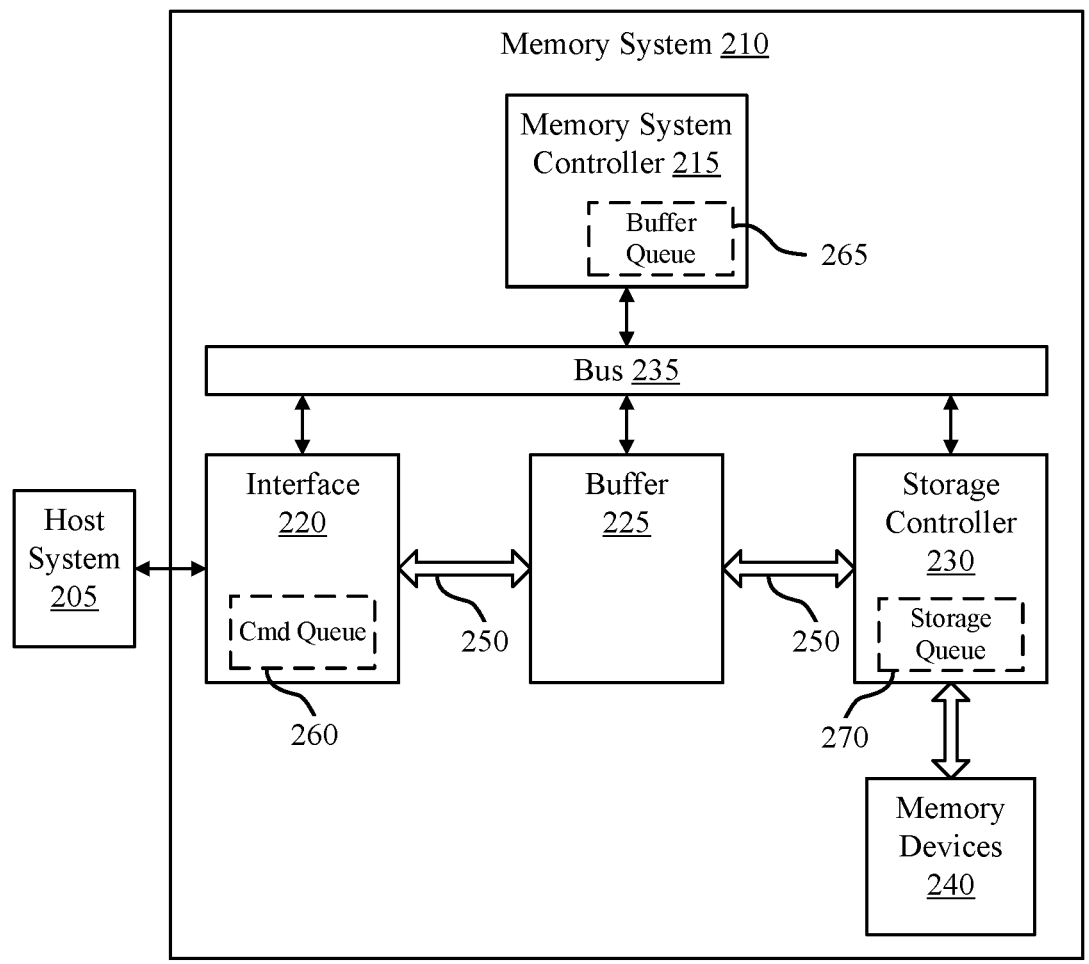
FIG. 2 illustrates an example of a system that supports logic remapping techniques in accordance with examples as disclosed herein.

Features of the disclosure are initially described in the context of systems, devices, and circuits with reference to FIGS. 1 through 2. Features of the disclosure are described in the context of mapping schemes and process flows with reference to FIGS. 3-5. These and other features of the disclosure are further illustrated by and described in the context of an apparatus diagram and flowchart that relate to logic remapping techniques with reference to FIGS. 6-7.

FIG. 1 illustrates an example of a system 100 that supports logic remapping techniques in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115)

via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multilevel cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165 c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be rewritten with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a L2P mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support logic remapping techniques. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a MNAND system.

The system 100 may support a L2L table as described herein. For example, the memory system 110 (or the host system 105) may use the L2L table (e.g., L2L mapping) in addition or alternative to an L2P table to support remapping of logical addresses as part of a defragmentation operation, for example, without rewriting data to new physical addresses. For example, the host system 105 may update one or more logical addresses (e.g., the host system 105 may perform a defragmentation operation to remap logical addresses of one or more files or data in a contiguous logical space) without rewriting data in the physical space to new physical addresses of the memory system 110, which may improve defragmentation speed and reduce media wearout. In some examples, the host system 105 may include or be referred to as a file system. The memory system 110 may generate an entry of an L2L table that maps a first logical address (e.g., mapped to a physical address prior to the updating) to a second logical address (e.g., mapped to the physical address after the updating). Thus, the memory system 110 may use the L2L table to maintain an up-to-date mapping of logical and physical addresses without using read and write commands to remap the logical addresses. For example, recording the changed logical address in the L2L table may enable the memory system to successfully validate metadata (e.g., using the first logical address with which the metadata was generated upon storage of the data) without having to rewrite the data to a different physical address, among other benefits. That is, an entry of the L2P table may map the second logical address with an indication of the first physical address. In some examples, the indication of the first physical address may be a pointer to an L2L table including a pointer to the first physical address.

Additionally or alternatively, the system 100 may maintain one or more bitmaps indicating physical addresses that correspond to remapped logical addresses, one or more counters indicating a quantity of remapped locations in a respective block 170, or any combination thereof.

FIG. 2 illustrates an example of a system 200 that supports logic remapping techniques in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match).

The memory system 210 may additionally include a memory system controller 215 for executing the commands received from the host system 205 and controlling the data path components in the moving of the data. The memory system controller 215 may be an example of the memory system controller 115 as described with reference to FIG.

1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received after receiving the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, or other operations). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, if the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

The system 200 may support a L2L table as described herein. For example, the memory system 210 (or the host system 205) may use the L2L table (e.g., L2L mapping) in addition or alternative to an L2P table to support remapping of logical addresses without rewriting data to different physical addresses. For example, the system 200 may update one or more logical addresses (e.g., the host system 205 may perform a defragmentation operation to rewrite one or more files or data in a contiguous logical space) without rewriting data in the physical space, which may improve defragmentation speed and reduce media wearout. The memory system may generate an entry of an L2L table that maps a first logical address (e.g., mapped to a physical address prior to the updating) to a second logical address (e.g., mapped to the physical address after the updating). Thus, the memory system may use the L2L table to maintain an up-to-date mapping of logical and physical addresses without frequent physical remapping. For example, recording the changed logical address in the L2L table may enable the memory system to successfully validate metadata (e.g., using the first logical address with which the metadata was generated upon storage of the data) without having to rewrite the physical address of the data, among other benefits. In some examples, the L2L table may be an example of an L2L table as described with reference to FIG. 4. Additionally or alternatively, the system 200 may maintain one or more bitmaps indicating physical addresses that correspond to remapped logical addresses, one or more counters indicating a quantity of remapped locations in a respective block, or any combination thereof.

Figure 3:
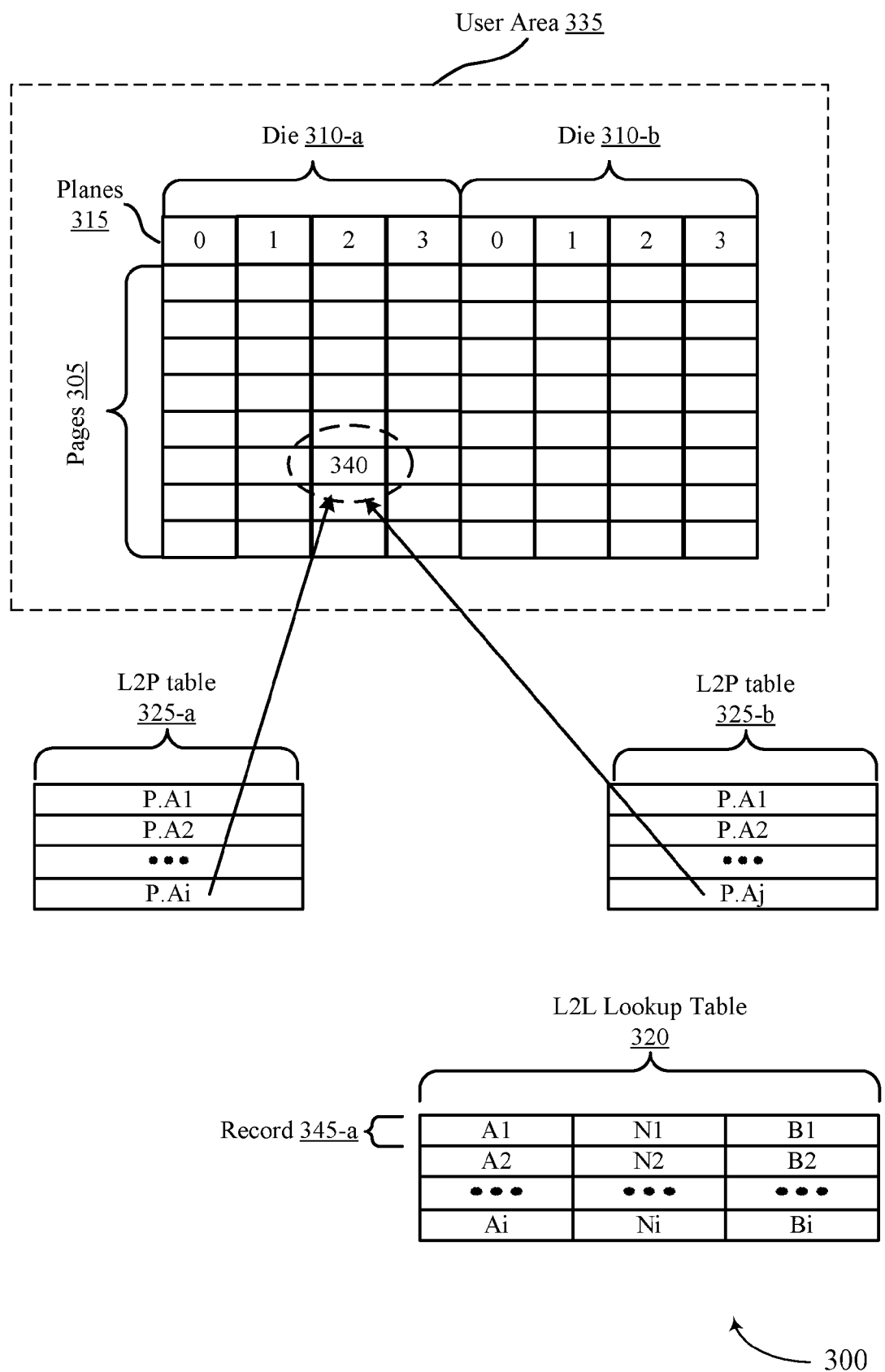
FIG. 3 illustrates an example of a mapping scheme that supports logic remapping techniques in accordance with examples as disclosed herein.

FIG. 3 illustrates an example of a mapping scheme 300 that supports logical remapping for memory systems in accordance with examples as disclosed herein. The mapping scheme 300 may be an example of aspects of a memory system as described with reference to FIGS. 1 and 2. The mapping scheme 300 may include a user area 335, a first L2P table 325, a second L2P table 330, and an L2L table 330.

The user area 335 may be an example of physical storage for user data (or other data) of a memory system (e.g., a memory system 110) as described herein. For example, the user area 335 may include a die 310-*a*, a die 310-*b*, a set of planes 315 (e.g., denoted as 0, 1, 2, and 3 for a respective die 310 in the example of FIG. 3), and pages 305, which may be examples of dies, planes, and pages as described herein with reference to FIGS. 1 and 2. Each segment of the user area 335 (e.g., an example of a segment or location may be Die 0, Plane 1, Page 4) may correspond to a physical address of stored information. That is, the physical address may be the physical location in the user area 335 that respective information is stored. The information stored at a physical address may be associated with an LBA.

In some cases, the memory system may receive an access command (e.g., a read or write command, among other examples of commands) to write or read data at an associated LBA. For example, a host system may send a write command to store data at an LBA associated with the memory system. The memory system may write the data to a physical location of the user area 335 and store a correspondence (e.g., mapping) between the LBA and the physical location in an L2P table. Thus, if the memory system receives a read command for the LBA, the memory system may refer to the L2P table to identify the physical location and retrieve the data from the indicated physical address in response to the read command.

In some examples, the memory system may generate metadata for information (e.g., if storing the information as part of a write operation) and store that metadata with the data at the physical location in the memory system. For example, the memory system may generate metadata using the physical location, the LBA, the data, or any combination thereof. The metadata may be an example of properties associated with the stored data (e.g., a time the data was stored, a category of the data, a physical or logical location of the data, or the like, among other examples of metadata). The memory system may store the metadata to improve the reliability of the data. For example, the memory system may read the data (e.g., information) as part of a read command and compare the metadata to one or more properties of the data. In some instances, the metadata may include the logical address associated with the data (at least initially). During a read operation, the memory system may compare the logical address included in the read command with the logical address included in the metadata as a validation check that the read data is correct. If the logical addresses do not match, the memory system may indicate to the host system that the read command failed. If the metadata matches the one or more properties (e.g., an indication of the logical or physical location of the data matches where the L2P table points), the memory system may determine that the read data is correct (e.g., the correct location was read, the data includes no errors or a correctable amount of errors, or the like) and may transmit the data to the host system.

In some examples, the memory system may perform operations that may result in remapping one or more entries of an L2P table. For example, the host system or the memory system may perform a defragmentation operation. Defragmentation may involve reorganizing data files in a logical space (e.g., changing the logical addresses assigned to data stored at physical addresses) to have a contiguous set of data, which may improve efficiency (e.g., reduce latency) of the host system, among other benefits. Defragmentation operations may be used by host systems to create more contiguous groups of logical addresses and thereby improve performance. In some systems, the host system may issue read and write commands as part of the defragmentation operation. For example, if the host system desires to remap a logical address, it may issue a read command to read the data from the logical address and then may issue a write command to write the data to a different logical address. Such operations may also cause the data to be stored in new physical addresses. The quantity of read commands and write commands as part of the defragmentation operation may take time, consume power, may increase the wear put on memory cells, thereby reducing the performance of the memory system and reducing an operational life of the memory system.

Additionally or alternatively, the memory system may perform a garbage collection operation as described herein with reference to FIGS. 1 and 2. Defragmentation may be similar to garbage collection (e.g., in that they both involve altering file storage to improve system efficiency), but garbage collection may involve removing (e.g., deleting) obsolete data to free up space at the physical addresses, while defragmentation may involve reorganizing data at the logical addresses, for example, to store files contiguously in a logical addressing space.

As an illustrative example, the memory system may assign a new logical address to the data as part of a defragmentation operation or some other operation. In some cases, the memory system may also rewrite the data to a new physical address, for example, to maintain the accuracy of the L2P table 325-b and avoid incongruities between the L2P table 325-b and the metadata generated using the physical address. For the memory system to perform read operations correctly (e.g., to reliably access the correct physical address after reading a command referencing a corresponding logical address) the memory system may keep both the L2P mapping and the metadata up-to-date after defragmentation operations. Updating the L2P mapping and metadata may involve computational overhead and, in some cases, physical wear for the memory systems (e.g., due to relatively frequency rewriting of the physical data). Thus, it may improve efficiency of the memory system to perform defragmentation operations without changing the physical address of data stored on the NAND memory.

The memory system may implement the L2L table 320 as described herein, in addition or alternative to an L2P table 325. For example, the memory system may maintain a mapping between logical addresses and physical addresses using an L2P table 325. In the example of FIG. 3, the L2P table 325-a may illustrate an L2P table before a remapping operation (e.g., a defragmentation operation) and the L2P table 325-b may illustrate the L2P table after the remapping operation (e.g., the L2P table 325-a and the L2P table 325-b may be the same L2P table shown at different times for illustrative clarity). The L2P tables 325 may be examples of L2P tables as described with reference to FIGS. 1 and 2. For example, the L2P tables 325 may map LBAs to physical block addresses (PBAs) (e.g., the L2P table 325 may include pointers to physical addresses at the user area 335). Each entry of an L2P table 325 may include a logical address and a pointer to a physical address, thus mapping the stored information to its corresponding logical and physical addresses. For example, an entry of the L2P table 325-a (e.g., entry P.Ai) and an entry of the L2P table 325-b (e.g., entry P.Aj) may point to the same physical address (e.g., physical block 340), but the physical address may be mapped to different logical addresses (e.g., denoted as i and j, respectively).

In some cases, the memory system may use a L2L table 320 to map or otherwise indicate a correspondence between logical addresses of the L2P table 325-a before a defragmentation operation (or other operations) to logical addresses of the L2P table 325-b after the defragmentation operation. The L2L table 320 may support remapping of logical addresses and improve efficiency of the memory system by recording information in an auxiliary table. Each row of the L2L table 320 (e.g., each row may be a record 345 indicating a logical remapping) may describe the correspondence between two logical addresses or between two logical ranges.

As an example, the L2L table 320 shown in FIG. 3 may have three columns (though any other format or table layout for storing a correspondence between two logical addresses may be used). In this example, the first column (i.e., column "A") may correspond to logical addresses before a remapping operation (e.g., the logical address of the L2P table 325-a prior to a defragmentation operation) and a second column (i.e., column "B") corresponding to logical addresses after a remapping operation (e.g., the logical address of the L2P table 325-b subsequent to a defragmentation operation). In some examples, the L2L table 320 may include a third column (i.e., column "N") indicating a length parameter associated with a corresponding record. That is, the third column may indicate a quantity of logic blocks between the starting logical address indicated in column "A" (e.g., the starting address of the L2P table 325-a for the logic blocks) and the starting logical address indicated in column "B" (e.g., the starting address of the L2P table 325-b of the logic blocks after a defragmentation operation). As an example, multiple LBAs may be moved together during a defragmentation operation (e.g., from the same first starting location to the same second starting location), and therefore may be included together in one entry of the L2L table. Tracking this information in the N-column of the L2L table 320 may enable the memory system to compress the L2L table 320. For example, individual entries in the L2L table are not needed for each logical address that is remapped. Rather, consecutive logical addresses can be remapped as a unit to a different set of consecutive logical addresses In some cases, each row of the L2L table 320 may be or indicate a record 345 of a remapped logical address corresponding to the user area 335. As an illustrative example, the last entry of the L2P table 325-a may be remapped during a defragmentation operation to the last entry of the L2P table 325-b (e.g., a physical block 340 may correspond to a first LBA i at a first time and a second LBA j at a second time without being physically rewritten). Based on such remapping, the memory system may generate an entry of the L2L table 320, such as the record 345-d indicating the remapping. For example, the record 345-d may include Ai (e.g., the starting address of the data stored at 340 for the L2P table 325-a), Ni (e.g., the quantity of logic blocks or other units of data stored at 340), and Bi (e.g., the updated starting logical address for the L2P table 325-b). Stated alternatively, in the example if a host system moves a range of N logic blocks from the starting address A to the starting address B, an entry (e.g., record 345-d) may be added to the list to record the three numbers.

The memory system may use one or more algorithms or operations to search the L2L table 320. In some examples, the memory system may search the L2L table 320 in response to receiving an access command (e.g., a read command). The memory system may to determine if a received logical address "X" (e.g., received as part of a read command) is included in the range of LBAs indicated by the L2L table 320. For example, for each incoming read command on LBA "X," the memory system may search in the table for a record 345 indicating that the LBA X is an address that has been remapped and thus the previous address (e.g., in the "A" column) may be used in validating metadata. As an example of a searching algorithm, the memory system may determine, for an LBA X, if $B_i \leq X \leq B_i + N_i$, where $B_i$ represents any LBA in the "B" column and N represents a respective length of remapped logic blocks corresponding to the entry in the B column. If the memory system determines the sought logical address is within the range of an entry of the L2L table, the memory system may use the table to determine the logical address after the defragmentation operation. For instance, the memory system may search the L2L table 320 for a record of the received logical address, and may use the corresponding information (e.g., the address A prior to a remapping operation) to validate the metadata. In some examples, the algorithm search may be run if a mismatch between the stored metadata and one or more properties of the data is detected, during error handling and garbage collection, or other examples of triggers, or any combination thereof. By running the algorithm in response to such criteria, the memory system may reduce the quantity of searches performed, which may improve performance (e.g., space efficiency, loading time) for some types of devices (e.g., managed NAND (MNAND) devices with limited static random access memory (SRAM)).

In some cases, normalization algorithms may be used to search the L2L table 320 during garbage collection. For example, the memory system may search a pivot (PVT) table to initiate garbage collection at the memory cells. The garbage collector may copy data from a physical source block (e.g., the physical block 340) and retrieve logical address information from the metadata. In some cases, the memory system may flush the change log and may discover a discrepancy between the logical address of the metadata and the logical address of the change log.

In some cases, the memory system may use a searching algorithm to address this mismatch during garbage collection. In some cases, if garbage collection is executed during idle time, the memory system may search the L2L table 320 for garbage collection. For example, the memory system may search the L2L table for each source block to update the mapping. In some cases, for example if garbage collection is triggered in the foreground of the memory system, the memory system may execute a search method with reduced overhead. For example, the memory system may generate and/or maintain a bitmap of the remapped physical addresses, which may enable the memory system to search the L2L table 320 if the bitmap indicates one or more addresses of the source block has been remapped.

For example, the bitmap may include one bit per PBA. In some cases, other granularities may be used, for example one bit per page, superpage, wordline, or other quantity of physical memory. The memory system may use a higher-level table with pointers to the virtual-basis (VB) bitmaps to be loaded or referred to during garbage collection. For example, the memory system may store the bitmaps and tables in SRAM, or in some other cache or volatile memory device. As an illustrative example of a bitmap, each page 305 of the user area 335 may correspond to a bit of the bitmap. If a page is remapped logically (e.g., physical block 340 is updated from an LBA "i" in the L2P table 325-a to "j" in the L2P table 325-b), the memory system may store an indication (e.g., a 1 or a 0) in the respective bit. Thus, in response to the memory system performing garbage collection for a source block, the memory system may update the metadata using the entry of the L2L table in response to a bit indicating that at least a portion of the source block has been remapped.

Additionally or alternatively, the memory system may keep a counter of the quantity of remapped locations. The counter may be used to prioritize garbage collection in the most frequently remapped areas of memory. As an example, a counter may correspond to a portion of the user area (e.g., the counter may be per block, per page, per superpage, per wordline, or other quantity of physical memory). The memory system may increment the counter each time a remap of the respective portion of the user area 335 is remapped. The memory system may prioritize areas with relatively high counters if performing garbage collection. For example, if a counter satisfies a threshold value, the memory system may perform garbage collection in response to the satisfied threshold, or if performing garbage collection the memory system may identify a highest one or more counters (e.g., relative to each counter in a source block) and update the metadata or otherwise perform garbage collection for the areas corresponding to the highest one or more counters.

Figure 4:
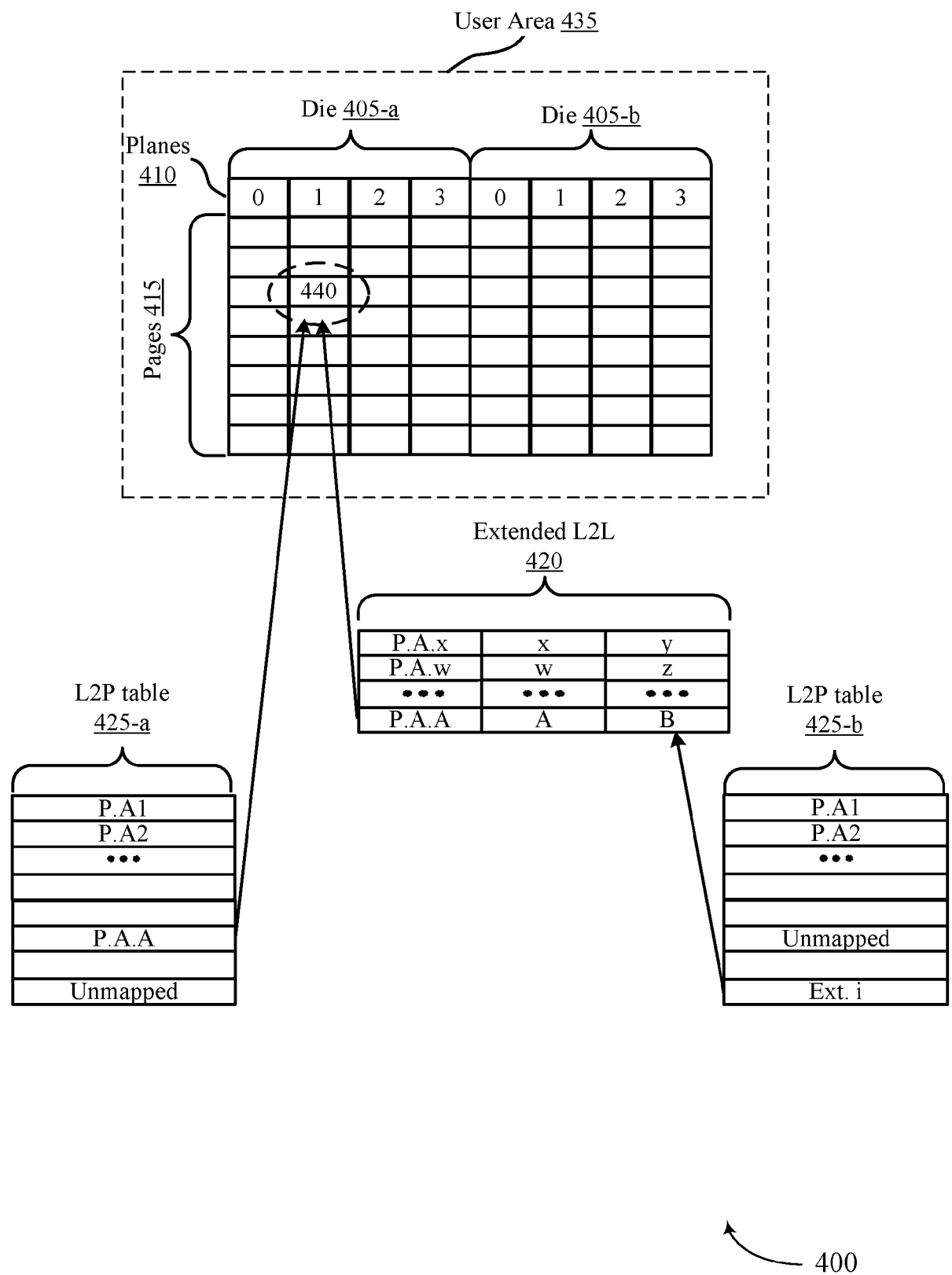
FIG. 4 illustrates an example of a mapping scheme that supports logic remapping techniques in accordance with examples as disclosed herein.

FIG. 4 illustrates an example of a mapping scheme 400 that supports logical remapping for memory systems in accordance with examples as disclosed herein. The mapping scheme 400 may be an example of aspects of a memory system as described with reference to FIGS. 1 and 2, aspects of the mapping scheme 300, or any combination thereof. The mapping scheme 400 may include a user area 435 and an L2P table 425, which may be examples of a user area 335 and an L2P table 325 as described with reference to FIG. 3. For example, the user area 435 may include the dies 405-*a* and 405-*b*, the planes 410, the pages 415, and a physical block 440, which may be examples of the corresponding components described in FIG. 3. Generally, the mapping scheme 400 may illustrate an example of an L2L table 420 that supports logic remapping techniques.

The user area 435 may include the dies 405-*a* and 405-*b*, which may each support a specified capacity for data storage. Each memory die 405 may further include a plurality of planes 410 (e.g., memory die 405-*a* including four planes 410 labeled 0-3), where each plane 410 may include a respective set of pages 415, and each page 415 may include a set of memory cells. Each block of the user area 435 (e.g., physical block 440, located at die 405-*a*, plane 1, page 3) may be a physical block address (PBA) of stored information. The information stored at a physical address may also be associated with an LBA. In some cases, the memory system may have a granularity of one LBA mapped to each PBA, unless compression is used for physically contiguous ranges.

In some cases, the L2P table 425-*a* may point from a logical address "A" to a physical address "A" (e.g., the physical address of the block 440). The L2P table 425-*a* may illustrate examples of mappings between logical and physical block addresses before the memory system performs an example defragmentation operation. After such a defragmentation operation, the affected entries of the L2P table 425-*a* may be updated to the entries of the L2P table 425-*b*. In some cases, some entries of the L2P table 425-*b* may point directly to a physical address. For example, if an entry is not impacted by a defragmentation operation (e.g., neither the logical nor physical address has changed) the entry in the L2P table 425-*a* and the entry in the L2P table 425-*b* may be the same, and both may point to a same physical block of the user area 435. In some cases, some physical addresses may not be mapped to a respective logical address, so some entries of the L2P tables 425 may not include a pointer to a physical block (e.g., "unmapped" entries).

In some cases, a memory system may store L2P tables in a fast random-access memory (e.g., DRAM, 3D XPoint (3DXP), FeRAM, MRAM, SRAM). The memory system may add indications (e.g., pointers) of respective entries of the L2L 420 to the L2P table 425-*b* to avoid or reduce the computational overhead of performing a search. That is, in some cases, the pointer to the physical address from the L2P table 425-*a* (e.g., labelled as P.A.A in the example of FIG. 4) may be replaced by a pointer to the L2L 420 from the L2P 425-*b* (e.g., labelled as "Ext. i" in the example of FIG. 4). For example, after the memory system performs a defragmentation operation, the memory system may insert a pointer to the L2L 420 in response to remapping the logical address from "A" to "B" for the physical address "A" of the physical block 440.

That is, rather than adjusting the entry of L2P table 425-*b* to include a mapping between logical address "B" and physical address "A," the memory system may insert a pointer in the L2P table 425-*b* that points to an entry in the L2L 420. The entry in the L2L 420 may include the new logical address (e.g., B), the old logical address (e.g., A) and a pointer from the L2L to the physical address "A" (e.g., the physical block 440). The memory system may read the information at the physical block 440 after following the mapping from the L2P table 425-*b* to the L2L 420 to the physical block 440.

In some cases, during some processes (e.g., garbage collection, receiving an access command), the memory system may use the metadata to verify via the logical addresses that the correct physical address has been accessed. Although in some cases the memory system may initially flag a mismatch between the metadata and the physical address, the memory system may verify the metadata using the information found in the L2L 420. By using the L2L 420 as an intermediary mapping between the physical addresses of the user area 435 and the L2P table 425-*b*, the memory system may avoid performing a search to verify metadata because it may have already accessed the logical addresses both before and after defragmentation. Stated alternatively, the configuration of mapping scheme 400 may enable the memory system to refer to the L2L 420 (in response to the pointer in the L2P table 425-*b*) including the correct information for metadata validation in response to a remapping operation, and for other unaltered entries of the L2P table 425-*b* the memory system may refrain from performing a search algorithm to save processing power and improve latency of read operations.

Figure 5:
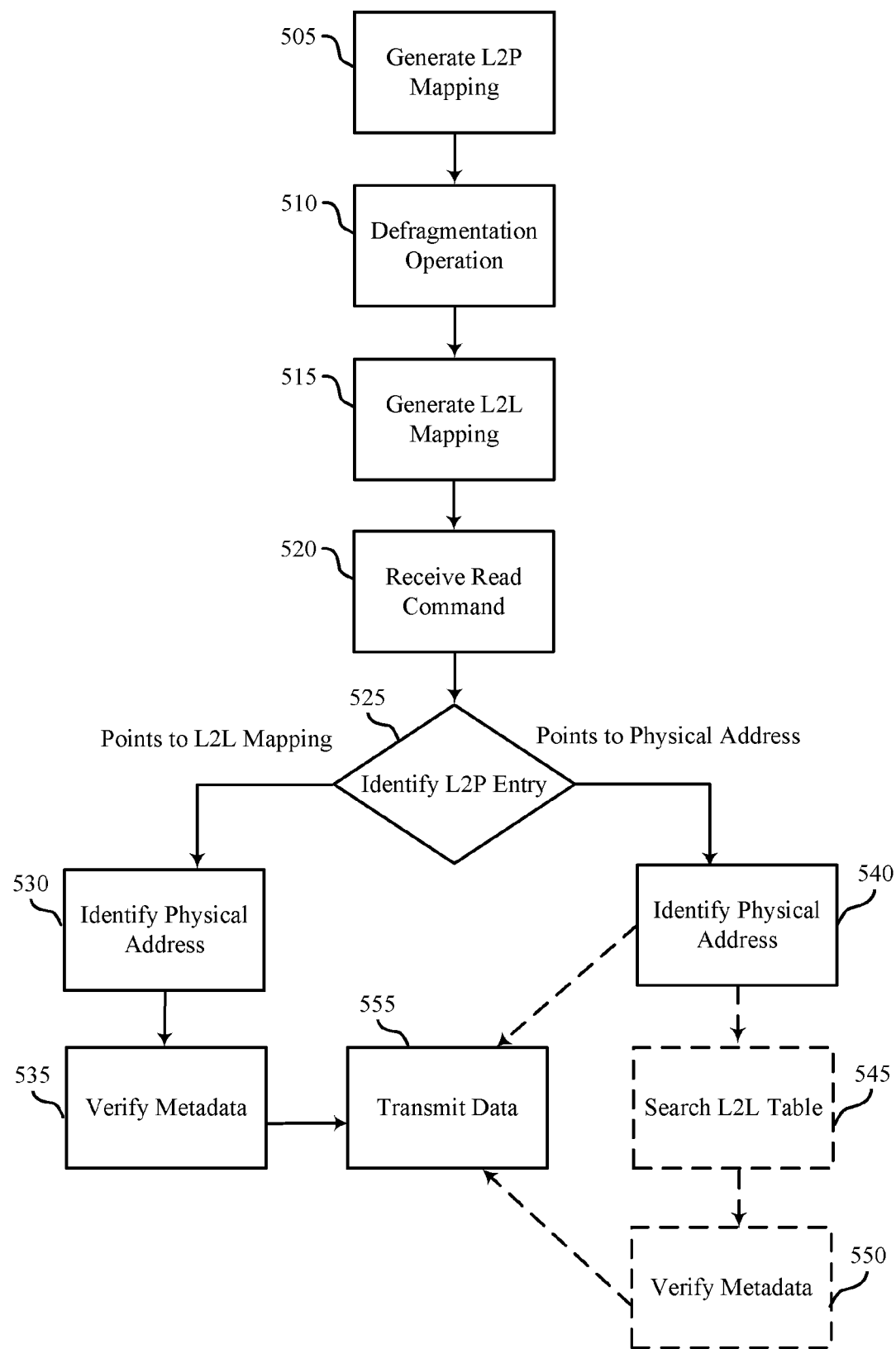
FIG. 5 illustrates an example of a process flow that supports logic remapping techniques in accordance with examples as disclosed herein.

FIG. 5 illustrates an example of a process flow 500 that supports logical remapping for memory systems in accordance with examples as disclosed herein. Process flow 500 may be implemented by a memory system, which may represent a memory system described with respect to FIGS. 1-4. Process flow 500 may be implemented by the memory system, for example, to generate a mapping between logical and physical block addresses of the memory system and remap as changes occur to either logical or physical addresses (e.g., due to defragmentation operations or other processes). Alternative examples of the following may be implemented, where some steps are performed in a different order or not at all. Additionally, some steps may include additional features not mentioned below, some steps may be performed by different components or systems, or any combination thereof.

Aspects of the process flow 500 may be implemented by a memory system, a memory device, a controller, among other components (e.g., a memory device controller such as an MNAND die of a memory device). Additionally or alternatively, aspects of the process flow 500 may be implemented as instructions in stored memory (e.g., firmware stored in a memory coupled with the memory system. For example, the instructions, if executed by a controller (e.g., the memory system controller 115), may cause the controller to perform the operations of the process flow 500.

For example, as described herein with respect to FIGS. 3 and 4, the memory system may, in some cases, perform remapping by updating L2P mapping after each defragmentation operation and may reference the L2L mapping to verify metadata. In some cases, the L2L mapping may be an example of an L2L mapping as described with reference to FIG. 4.

At 505, an L2P mapping may be generated. For example, the memory system may generate an L2P mapping. The memory system may include information stored at physical addresses. In some cases, the memory system may receive a command (e.g., a write command) from a host system referencing a logical address of some information. The memory system may generate an L2P mapping, for example, to map the logical addresses referenced by the host system to the physical addresses of corresponding information stored at the memory system. In some cases, the memory system may proceed with the command (e.g., a read command) by using the L2P mapping to identify the physical address associated with the logical address referenced by the host system.

At 510, a defragmentation operation may be performed. For example, the host system may perform a defragmentation operation. In some cases, the host system may determine that a defragmentation may improve performance. In some examples, the host system may initiate a defragmentation operation that may include transmitting a plurality of read commands and a plurality of write commands to the memory system to cause the data to be remapped into different logical addresses. In some examples, the host system may issue a defragmentation command to the memory system that causes logical addresses to be remapped without moving at least some data to new physical address. Additionally or alternatively, the memory system may initiate the defragmentation operation. The defragmentation operation may be an example of a defragmentation (e.g., remapping) operation as described herein. For example, as part of the defragmentation operation, the logical addresses mapped to physical addresses may be reorganized. The memory system may receive an indication of the new logical address for the information stored at the physical address. The host system may select the new organization such that data files are stored contiguously in the logical addressing space, which may free up space at the host system and improve the host system's efficiency at performing operations. In some cases, the physical address of the information may not change due to the defragmentation operation in accordance with some techniques described herein.

At 515, a logical-to-logical mapping is generated. For example, the memory system may generate an L2L mapping. For example, the reorganization of logical addresses occurring at step 510 may result in inconsistencies in the L2P mapping or metadata of the information (e.g., due to not rewriting the physical address of the information to another physical address). Thus, the memory system may generate the L2L mapping (e.g., an entry of an L2L table as described with reference to FIGS. 3 and 4) to include an indication of both the old logical address and the new logical address. In some cases, the memory system may adjust the entry in the L2P mapping during or after the defragmentation operation. In some cases, the adjusted L2P mapping may be a mapping between the new logical address and the physical address. In some cases, the L2P mapping may include a pointer to the L2L mapping (e.g., an L2L table described with reference to FIG. 4).

At 520, a read command may be received. For example, the memory system may receive a read command from the host system. The host system may indicate a logical address in the read command. At 525, an L2P entry may be identified. For example, the memory system may identify the L2P entry of the logical address indicating a physical address or an entry of the L2L table. If the L2P entry points to the L2L mapping, the memory system may proceed to 530. If the L2P entry points to a physical address, the memory system may proceed to 540.

At 530, a physical address may be identified. For example, the memory system may identify the physical address using the L2L mapping. For example, the L2P entry may point to an entry of the L2L mapping. The L2L entry may include the old logical address (e.g., the logical address included in the read command from the host system) as well as the new logical address (e.g., the updated logical address after defragmentation). The L2L entry may additionally include a pointer to the physical address. The memory system may perform the read operation at the location indicated by the pointer to the physical address. For example, the memory system may retrieve the data from the physical address and validate or updated metadata using the old logical address in the L2L entry, which may reduce a processing overhead for a search.

At 535, the metadata may be verified. For example, the memory system may verify that the logical address received in the command matches the logical address indicated by the metadata. For example, the memory system may compare information in the metadata to information in the L2L table to perform verification. In some cases, the memory system may not perform an additional search of the L2L table due to already accessing the L2L entry information at step 530. The memory system may verify that the metadata matches a logical address included in the L2L entry.

At 540, the physical address may be identified. For example, the memory system may identify the physical address after being directed by the pointer in the L2P entry. For example, the L2P entry may point directly to a physical block address at the memory system. In some cases, the memory system may perform the read operation after accessing the pointer to the physical address. For example, the memory system may retrieve the data and metadata from the physical address.

At 545, in some cases, the L2L table may be searched. For example, in some cases, the memory system may search the L2L table for the entry associated with the logical address received from the host system. For example, in some cases, the memory system may detect a mismatch between the logical address in the metadata and the logical address received in the read command from the host system. The memory system may use the L2L table to determine if the logical address has been updated. In some cases, the L2L entry may include the old logical address (e.g., the logical address stored in the metadata) and the new logical address (e.g., the logical address included in the read command).

At 550, in some cases, the metadata may be verified. For example, the memory system may verify that the logical address received in the command matches the logical address indicated by the metadata.

At 555, data transmission may occur. For example, the memory system may transmit the data to the host system. By transmitting the data, the memory system may conclude performing the read operation.

Figure 6:
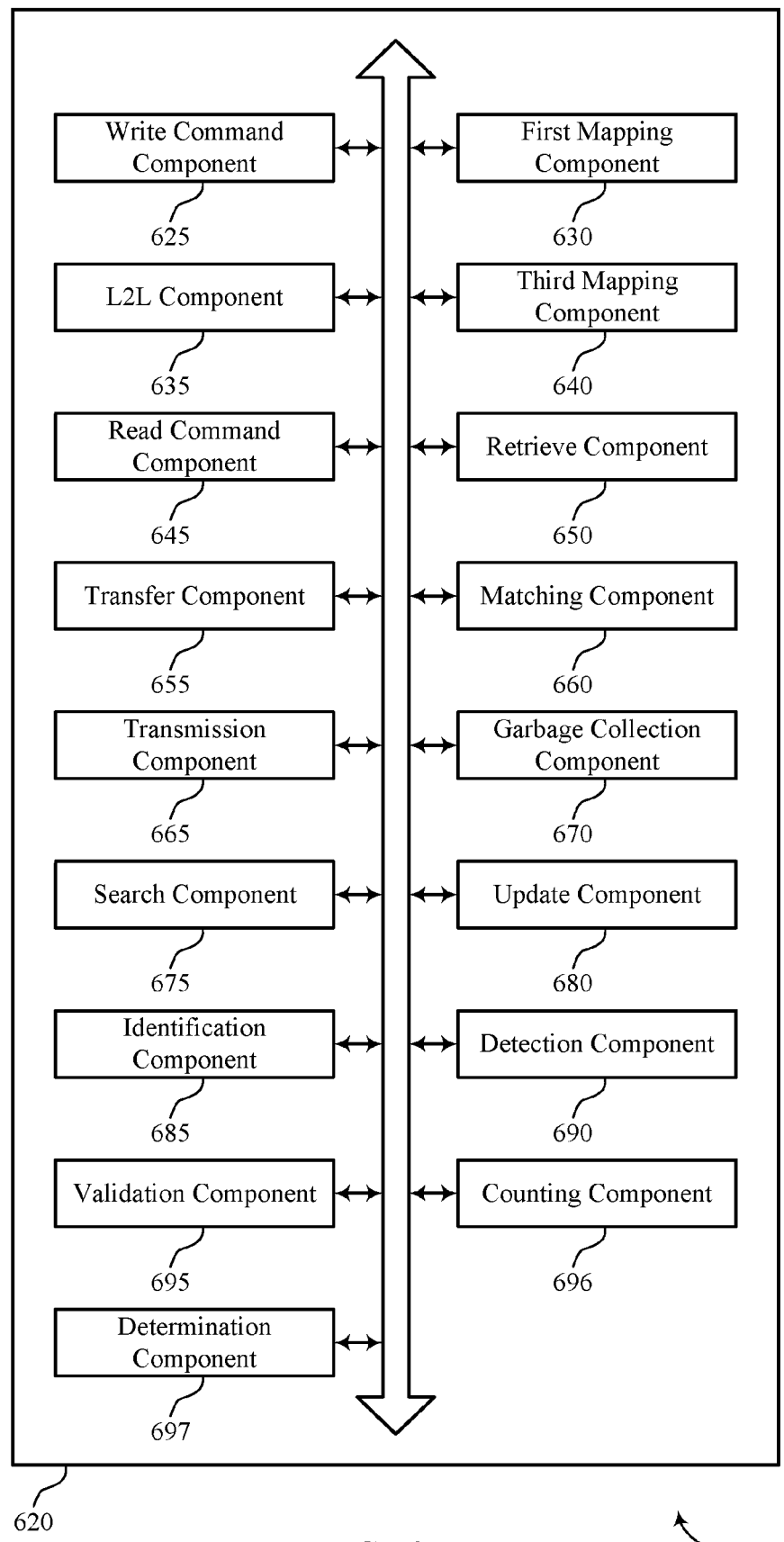
FIG. 6 shows a block diagram of a memory device that supports logic remapping techniques in accordance with examples as disclosed herein.

FIG. 6 shows a block diagram 600 of a memory system 620 (e.g., a memory system) that supports logic remapping techniques in accordance with examples as disclosed herein. The memory system 620 may be an example of aspects of a memory device or a memory system as described with reference to FIGS. 1 through 5. The memory system 620, or various components thereof, may be an example of means for performing various aspects of logic remapping techniques as described herein. For example, the memory system 620 may include a write command component 625, a first mapping component 630, a L2L component 635, a third mapping component 640, a read command component 645, a retrieve component 650, a transfer component 655, a matching component 660, a transmission component 665, a garbage collection component 670, a search component 675, an update component 680, an identification component 685, a detection component 690, a validation component 695, a counting component 696, a determination component 697, or any combination thereof. Each of these components may communicate, directly or indirectly, with one another (e.g., via one or more buses).

The write command component 625 may be configured as or otherwise support a means for receiving a write command to store information at a first logical address associated with the memory system. The first mapping component 630 may be configured as or otherwise support a means for generating a first entry of a logical-to-physical mapping that maps the first logical address with a first physical address of the memory system that stores the information after receiving the write command. The L2L component 635 may be configured as or otherwise support a means for generating, as part of a defragmentation operation, a second entry of a logical-to-logical mapping that maps the first logical address with a second logical address, the second logical address being associated with the information stored at the first physical address after the defragmentation operation. The third mapping component 640 may be configured as or otherwise support a means for generating, as part of the defragmentation operation, a third entry of the logical-to-physical mapping that maps the second logical address with an indication of the first physical address after generating the second entry.

In some examples, the third entry of the logical-to-physical mapping includes a pointer to the first physical address. In some examples, the third entry of the logical-to-physical mapping includes a pointer to the second entry of the logical-to-logical mapping. In some examples, the second entry of the logical-to-logical mapping includes an indication of the first logical address and the first physical address.

In some examples, the read command component 645 may be configured as or otherwise support a means for receiving a read command to retrieve the information associated with the second logical address. In some examples, the retrieve component 650 may be configured as or otherwise support a means for retrieving the information from the first physical address of the memory system after receiving the read command.

In some examples, the identification component 685 may be configured as or otherwise support a means for identifying the first physical address after reading the third entry of the logical-to-physical mapping that maps the second logical address to the first physical address of the memory system, where reading the information is coupled with the identifying.

In some examples, the identification component 685 may be configured as or otherwise support a means for identifying the first physical address after reading the third entry of the logical-to-physical mapping that maps the second logical address to the second entry of the logical-to-logical mapping, the second entry of the logical-to-logical mapping indicating the first physical address of the memory system, the first logical address, or both, where reading the information is coupled with the identifying.

In some examples, the transfer component 655 may be configured as or otherwise support a means for transferring, as part of the defragmentation operation, a first range of logical blocks from a first location having a first starting address to a second location having a second starting address, where the second entry indicates the first starting address, the second starting address, and a quantity of logical blocks in the first range of logical blocks.

In some examples, the read command component 645 may be configured as or otherwise support a means for receiving a read command to retrieve the information associated with the second logical address. In some examples, the retrieve component 650 may be configured as or otherwise support a means for retrieving the information and metadata associated with the information from the first physical address of the memory system after receiving the read command. In some examples, the matching component 660 may be configured as or otherwise support a means for determining whether a third logical address stored in the metadata matches the second logical address included in the read command. In some examples, the transmission component 665 may be configured as or otherwise support a means for transmitting the information in direct response to the determination.

In some examples, to support determining whether the third logical address stored in the metadata matches the second logical address included in the read command, the detection component 690 may be configured as or otherwise support a means for detecting a mismatch between the third logical address stored in the metadata and the second logical address included in the read command. In some examples, to support determining whether the third logical address stored in the metadata matches the second logical address included in the read command, the search component 675 may be configured as or otherwise support a means for searching the logical-to-logical mapping for an entry associated with the third logical address stored in the metadata after detecting a mismatch. In some examples, to support determining whether the third logical address stored in the metadata matches the second logical address included in the read command, the validation component 695 may be configured as or otherwise support a means for validating the information retrieved from the first physical address of the memory system after identifying the entry in the logical-to-logical mapping for the third logical address, where transmitting the information is coupled with validating the information.

In some examples, the garbage collection component 670 may be configured as or otherwise support a means for performing a garbage collection operation or an error handling operation that involves the first physical address. In some examples, the retrieve component 650 may be configured as or otherwise support a means for retrieving the information and metadata associated with the information from the first physical address of the memory system during or after performing the garbage collection operation or the error handling operation. In some examples, the search component 675 may be configured as or otherwise support a means for searching the logical-to-logical mapping for an entry associated with a third logical address stored in the metadata during or after performing the garbage collection operation or the error handling operation. In some examples, the update component 680 may be configured as or otherwise support a means for updating the metadata associated with the information after identifying the entry in the logical-to-logical mapping for the third logical address.

In some examples, the garbage collection component 670 may be configured as or otherwise support a means for performing a garbage collection operation to transfer valid data from a source block to a target block. In some examples, the update component 680 may be configured as or otherwise support a means for updating metadata associated with the source block to indicate an updated logical address associated with the information after reading the logical-to-logical mapping including one or more entries associated with the information.

In some examples, the search component 675 may be configured as or otherwise support a means for searching the logical-to-logical mapping for the one or more entries associated with the information, where updating the metadata is coupled with the searching.

In some examples, the identification component 685 may be configured as or otherwise support a means for identifying the one or more entries after reading a bitmap including an indication that the source block corresponds to the one or more entries of the logical-to-logical mapping.

In some examples, the indication that the source block corresponds to the one or more entries of the logical-to-logical mapping includes a bit for a page of the memory system, a bit for a superpage of the memory system, a bit for a wordline of the memory system, a bit for a physical block address of the memory system, or any combination thereof.

In some examples, the counting component 696 may be configured as or otherwise support a means for incrementing a counter associated with the source block after generating the one or more entries associated with the source block. In some examples, the determination component 697 may be configured as or otherwise support a means for determining whether a quantity of the counter is more than quantities of a set of counters associated with other blocks. In some examples, the garbage collection component 670 may be configured as or otherwise support a means for performing the garbage collection operation to transfer the valid data from the source block to the target block in response to the quantity of the counter being higher than the quantities of the set of counters.

Figure 7:
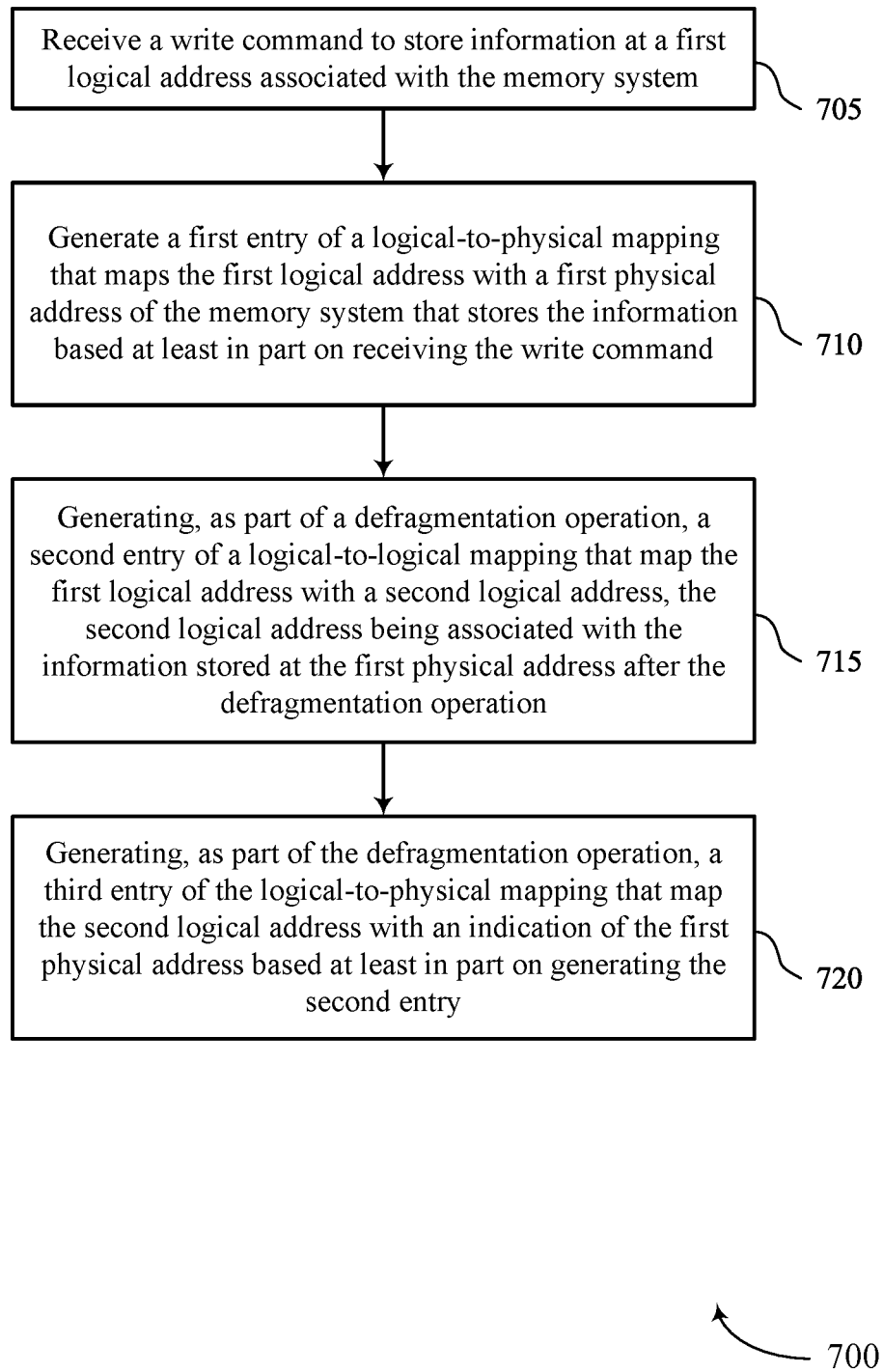
FIG. 7 shows a flowchart illustrating a method or methods that support logic remapping techniques in accordance with examples as disclosed herein.

FIG. 7 shows a flowchart illustrating a method 700 that supports logic remapping techniques in accordance with examples as disclosed herein. The operations of method 700 may be implemented by a memory system or its components as described herein. For example, the operations of method 700 may be performed by a memory system or a memory device as described with reference to FIGS. 1 through 6. In some examples, a memory system may execute a set of instructions to control the functional elements of the device to perform the described functions. Additionally or alternatively, the memory system may perform aspects of the described functions using special-purpose hardware.

At 705, the method may include receiving a write command to store information at a first logical address associated with the memory system. The operations of 705 may be performed in accordance with examples as disclosed herein. In some examples, aspects of the operations of 705 may be performed by a write command component 625 as described with reference to FIG. 6.

At 710, the method may include generating a first entry of a logical-to-physical mapping that maps the first logical address with a first physical address of the memory system that stores the information after receiving the write command. The operations of 710 may be performed in accordance with examples as disclosed herein. In some examples, aspects of the operations of 710 may be performed by a first mapping component 630 as described with reference to FIG. 6.

At 715, the method may include generating, as part of a defragmentation operation, a second entry of a logical-to-logical mapping that maps the first logical address with a second logical address, the second logical address being associated with the information stored at the first physical address after the defragmentation operation. The operations of 715 may be performed in accordance with examples as disclosed herein. In some examples, aspects of the operations of 715 may be performed by a L2L component 635 as described with reference to FIG. 6.

At 720, the method may include generating, as part of the defragmentation operation, a third entry of the logical-to-physical mapping that maps the second logical address with an indication of the first physical address in response to generating the second entry. The operations of 720 may be performed in accordance with examples as disclosed herein. In some examples, aspects of the operations of 720 may be performed by a third mapping component 640 as described with reference to FIG. 6.

In some examples, an apparatus as described herein may perform a method or methods, such as the method 700. The apparatus may include, features, circuitry, logic, means, or instructions (e.g., a non-transitory computer-readable medium storing instructions executable by a processor) for receiving a write command to store information at a first logical address associated with the memory system, generating a first entry of a logical-to-physical mapping that maps the first logical address with a first physical address of the memory system that stores the information after receiving the write command, generating, as part of a defragmentation operation, a second entry of a logical-to-logical mapping that maps the first logical address with a second logical address, the second logical address being associated with the information stored at the first physical address after the defragmentation operation, and generating, as part of the defragmentation operation, a third entry of the logical-to-physical mapping that maps the second logical address with an indication of the first physical address in response to generating the second entry.

In some examples of the method 700 and the apparatus described herein, the third entry of the logical-to-physical mapping includes a pointer to the first physical address.

In some examples of the method 700 and the apparatus described herein, the third entry of the logical-to-physical mapping includes a pointer to the second entry of the logical-to-logical mapping and the second entry of the logical-to-logical mapping includes an indication of the first logical address and the first physical address.

Some examples of the method 700 and the apparatus described herein may further include operations, features, circuitry, logic, means, or instructions for receiving a read command to retrieve the information associated with the second logical address and retrieving the information from the first physical address of the memory system after receiving the read command.

Some examples of the method 700 and the apparatus described herein may further include operations, features, circuitry, logic, means, or instructions for identifying the first physical address after reading the third entry of the logical-to-physical mapping that maps the second logical address to the first physical address of the memory system, where reading the information may be coupled with the identifying.

Some examples of the method 700 and the apparatus described herein may further include operations, features, circuitry, logic, means, or instructions for identifying the first physical address after reading the third entry of the logical-to-physical mapping that maps the second logical address to the second entry of the logical-to-logical mapping, the second entry of the logical-to-logical mapping indicating the first physical address of the memory system, the first logical address, or both, where reading the information may be coupled with the identifying.

Some examples of the method 700 and the apparatus described herein may further include operations, features, circuitry, logic, means, or instructions for transferring, as part of the defragmentation operation, a first range of logical blocks from a first location having a first starting address to a second location having a second starting address, where the second entry indicates the first starting address, the second starting address, and a quantity of logical blocks in the first range of logical blocks.

Some examples of the method 700 and the apparatus described herein may further include operations, features, circuitry, logic, means, or instructions for receiving a read command to retrieve the information associated with the second logical address, retrieving the information and metadata associated with the information from the first physical address of the memory system after receiving the read command, determining whether a third logical address stored in the metadata matches the second logical address included in the read command, and transmitting the information after reaching the determination.

In some examples of the method 700 and the apparatus described herein, determining whether the third logical address stored in the metadata matches the second logical address included in the read command may include operations, features, circuitry, logic, means, or instructions for detecting a mismatch between the third logical address stored in the metadata and the second logical address included in the read command, searching the logical-to-logical mapping for an entry associated with the third logical address stored in the metadata after detecting a mismatch, and validating the information retrieved from the first physical address of the memory system after identifying the entry in the logical-to-logical mapping for the third logical address, where transmitting the information may be coupled with validating the information.

Some examples of the method 700 and the apparatus described herein may further include operations, features, circuitry, logic, means, or instructions for performing a garbage collection operation or an error handling operation that involves the first physical address, retrieving the information and metadata associated with the information from the first physical address of the memory system during or after performing the garbage collection operation or the error handling operation, searching the logical-to-logical mapping for an entry associated with a third logical address stored in the metadata during or after performing the garbage collection operation or the error handling operation, and updating the metadata associated with the information after identifying the entry in the logical-to-logical mapping for the third logical address.

Some examples of the method 700 and the apparatus described herein may further include operations, features, circuitry, logic, means, or instructions for performing a garbage collection operation to transfer valid data from a source block to a target block and updating metadata associated with the source block to indicate an updated logical address associated with the information coupled with the logical-to-logical mapping including one or more entries associated with the information.

Some examples of the method 700 and the apparatus described herein may further include operations, features, circuitry, logic, means, or instructions for searching the logical-to-logical mapping for the one or more entries associated with the information, where updating the metadata may be couple with the searching.

Some examples of the method 700 and the apparatus described herein may further include operations, features, circuitry, logic, means, or instructions for identifying the one or more entries after reading a bitmap including an indication that the source block corresponds to the one or more entries of the logical-to-logical mapping.

In some examples of the method 700 and the apparatus described herein, the indication that the source block corresponds to the one or more entries of the logical-to-logical mapping includes a bit for a page of the memory system, a bit for a superpage of the memory system, a bit for a wordline of the memory system, a bit for a physical block address of the memory system, or any combination thereof.

Some examples of the method 700 and the apparatus described herein may further include operations, features, circuitry, logic, means, or instructions for incrementing a counter associated with the source block after generating the one or more entries associated with the source block, determining whether a quantity of the counter may be more than quantities of a set of counters associated with other blocks, and performing the garbage collection operation to transfer the valid data from the source block to the target block in direct response to the quantity of the counter being higher than the quantities of the set of counters.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit depending on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "electrode" may refer to an electrical conductor, and in some examples, may be employed as an electrical contact to a memory cell or other component of a memory array. An electrode may include a trace, wire, conductive line, conductive layer, or the like that provides a conductive path between elements or components of a memory array.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a memory device; and
   a controller coupled with the memory device and configured to cause the apparatus to:
   receive a write command to store information at a first logical address associated with the apparatus;
   generate a first entry of a logical-to-physical mapping that maps the first logical address with a first physical address of the apparatus that stores the information based at least in part on receiving the write command;
   generate, as part of a defragmentation operation, a second entry of a logical-to-logical mapping that maps the first logical address with a second logical address, the second logical address being associated with the information stored at the first physical address after the defragmentation operation; and
   generate, as part of the defragmentation operation, a third entry of the logical-to-physical mapping that maps the second logical address with an indication of the first physical address based at least in part on generating the second entry.

2. The apparatus of claim 1, wherein the third entry of the logical-to-physical mapping comprises a pointer to the first physical address.

3. The apparatus of claim 1, wherein:
   the third entry of the logical-to-physical mapping comprises a pointer to the second entry of the logical-to-logical mapping; and
   the second entry of the logical-to-logical mapping comprises an indication of the first logical address and the first physical address.

4. The apparatus of claim 1, wherein the controller is further configured to cause the apparatus to:
   receive a read command to retrieve the information associated with the second logical address; and
   retrieve the information from the first physical address of the apparatus based at least in part on receiving the read command.

5. The apparatus of claim 4, wherein the controller is further configured to cause the apparatus to:
   identify the first physical address based at least in part on the third entry of the logical-to-physical mapping that maps the second logical address to the first physical address of the apparatus, wherein reading the information is based at least in part on the identifying.

6. The apparatus of claim 4, wherein the controller is further configured to cause the apparatus to:
   identify the first physical address based at least in part on the third entry of the logical-to-physical mapping that maps the second logical address to the second entry of the logical-to-logical mapping, the second entry of the logical-to-logical mapping indicating the first physical address of the apparatus, the first logical address, or both, wherein reading the information is based at least in part on the identifying.

7. The apparatus of claim 1, wherein the controller is further configured to cause the apparatus to:
   transfer, as part of the defragmentation operation, a first range of logical blocks from a first location having a first starting address to a second location having a second starting address, wherein the second entry indicates the first starting address, the second starting address, and a quantity of logical blocks in the first range of logical blocks.

8. The apparatus of claim 1, wherein the controller is further configured to cause the apparatus to:
receive a read command to retrieve the information associated with the second logical address;
retrieve the information and metadata associated with the information from the first physical address of the apparatus based at least in part on receiving the read command;
determine whether a third logical address stored in the metadata matches the second logical address included in the read command; and
transmit the information based at least in part on the determination.

9. The apparatus of claim 8, wherein determining whether the third logical address stored in the metadata matches the second logical address included in the read command is further configured to cause the apparatus to:
detect a mismatch between the third logical address stored in the metadata and the second logical address included in the read command;
search the logical-to-logical mapping for an entry associated with the third logical address stored in the metadata based at least in part on the detected mismatch; and
validate the information retrieved from the first physical address of the apparatus based at least in part on identifying the entry in the logical-to-logical mapping for the third logical address, wherein transmitting the information is based at least in part on validating the information.

10. The apparatus of claim 1, wherein the controller is further configured to cause the apparatus to:
perform a garbage collection operation or an error handling operation that involves the first physical address;
retrieve the information and metadata associated with the information from the first physical address of the apparatus based at least in part on performing the garbage collection operation or the error handling operation;
search the logical-to-logical mapping for an entry associated with a third logical address stored in the metadata based at least in part on performing the garbage collection operation or the error handling operation; and
update the metadata associated with the information based at least in part on identifying the entry in the logical-to-logical mapping for the third logical address.

11. The apparatus of claim 1, wherein the controller is further configured to cause the apparatus to:
perform a garbage collection operation to transfer valid data from a source block to a target block;
update metadata associated with the source block to indicate an updated logical address associated with the information based at least in part on the logical-to-logical mapping comprising one or more entries associated with the information.

12. The apparatus of claim 11, wherein the controller is further configured to cause the apparatus to:
search the logical-to-logical mapping for the one or more entries associated with the information, wherein updating the metadata is based at least in part on the searching.

13. The apparatus of claim 11, wherein the controller is further configured to cause the apparatus to:
identify the one or more entries based at least in part on a bitmap comprising an indication that the source block corresponds to the one or more entries of the logical-to-logical mapping.

14. The apparatus of claim 13, wherein the indication that the source block corresponds to the one or more entries of the logical-to-logical mapping comprises a bit for a page of the apparatus, a bit for a superpage of the apparatus, a bit for a wordline of the apparatus, a bit for a physical block address of the apparatus, or any combination thereof.

15. The apparatus of claim 11, wherein the controller is further configured to cause the apparatus to:
increment a counter associated with the source block based at least in part on generating the one or more entries associated with the source block;
determine whether a quantity of the counter is more than quantities of a set of counters associated with other blocks; and
perform the garbage collection operation to transfer the valid data from the source block to the target block based at least in part on the quantity of the counter being higher than the quantities of the set of counters.

16. A non-transitory computer-readable medium storing code comprising instructions which, when executed by a processor of an electronic device, cause the electronic device to:
receive a write command to store information at a first logical address associated with a memory system;
generate a first entry of a logical-to-physical mapping that maps the first logical address with a first physical address of the memory system that stores the information based at least in part on receiving the write command;
generate, as part of a defragmentation operation, a second entry of a logical-to-logical mapping that maps the first logical address with a second logical address, the second logical address being associated with the information stored at the first physical address after the defragmentation operation; and
generate, as part of the defragmentation operation, a third entry of the logical-to-physical mapping that maps the second logical address with an indication of the first physical address based at least in part on generating the second entry.

17. The non-transitory computer-readable medium of claim 16, wherein the third entry of the logical-to-physical mapping comprises a pointer to the first physical address.

18. The non-transitory computer-readable medium of claim 16, wherein:
the third entry of the logical-to-physical mapping comprises a pointer to the second entry of the logical-to-logical mapping; and
the second entry of the logical-to-logical mapping comprises an indication of the first logical address and the first physical address.

19. The non-transitory computer-readable medium of claim 16, wherein the instructions, when executed by the processor of the electronic device, further cause the electronic device to:
receive a read command to retrieve the information associated with the second logical address; and
retrieve the information from the first physical address of the memory system based at least in part on receiving the read command.

20. The non-transitory computer-readable medium of claim 19, wherein the instructions, when executed by the processor of the electronic device, further cause the electronic device to identify the first physical address based at least in part on the third entry of the logical-to-physical mapping that maps the second logical address to the first physical address of the memory system, wherein reading the information is based at least in part on the identifying.

21. The non-transitory computer-readable medium of claim 19, wherein the instructions, when executed by the processor of the electronic device, further cause the electronic device to identify the first physical address based at least in part on the third entry of the logical-to-physical mapping that maps the second logical address to the second entry of the logical-to-logical mapping, the second entry of the logical-to-logical mapping indicating the first physical address of the memory system, the first logical address, or both, wherein reading the information is based at least in part on the identifying.

22. The non-transitory computer-readable medium of claim 16, wherein the instructions, when executed by the processor of the electronic device, further cause the electronic device to transfer, as part of the defragmentation operation, a first range of logical blocks from a first location having a first starting address to a second location having a second starting address, wherein the second entry indicates the first starting address, the second starting address, and a quantity of logical blocks in the first range of logical blocks.

23. The non-transitory computer-readable medium of claim 16, wherein the instructions, when executed by the processor of the electronic device, further cause the electronic device to:
receive a read command to retrieve the information associated with the second logical address;
retrieve the information and metadata associated with the information from the first physical address of the memory system based at least in part on receiving the read command;
determine whether a third logical address stored in the metadata matches the second logical address included in the read command; and
transmit the information based at least in part on the determination.

24. The non-transitory computer-readable medium of claim 23, wherein the instructions, when executed by the processor of the electronic device, further cause the electronic device to:
detect a mismatch between the third logical address stored in the metadata and the second logical address included in the read command;
search the logical-to-logical mapping for an entry associated with the third logical address stored in the metadata based at least in part on the detected mismatch; and
validate the information retrieved from the first physical address of the memory system based at least in part on identify the entry in the logical-to-logical mapping for the third logical address, wherein transmitting the information is based at least in part on validating the information.

25. A method performed by a memory system, comprising:
receiving a write command to store information at a first logical address associated with the memory system;
generating a first entry of a logical-to-physical mapping that maps the first logical address with a first physical address of the memory system that stores the information based at least in part on receiving the write command;
generating, as part of a defragmentation operation, a second entry of a logical-to-logical mapping that maps the first logical address with a second logical address, the second logical address being associated with the information stored at the first physical address after the defragmentation operation; and
generating, as part of the defragmentation operation, a third entry of the logical-to-physical mapping that maps the second logical address with an indication of the first physical address based at least in part on generating the second entry.

* * * * *